United States Patent
Shelby

(10) Patent No.: US 8,923,182 B2
(45) Date of Patent: Dec. 30, 2014

(54) METHOD AND APPARATUS FOR PROVIDING IPV6 LINK-LAYER ADAPTATION OVER A WIRELESS CHANNEL

(75) Inventor: Zachary Shelby, Sotkamo (FI)

(73) Assignee: Arm Finland Oy, Oulu (FI)

( * ) Notice: Subject to any disclaimer, the term of this patent is extended or adjusted under 35 U.S.C. 154(b) by 677 days.

(21) Appl. No.: 12/821,180

(22) Filed: Jun. 23, 2010

(65) Prior Publication Data

US 2011/0317673 A1 Dec. 29, 2011

(51) Int. Cl.
- *H04W 80/02* (2009.01)
- *H04W 4/00* (2009.01)
- *H04W 4/14* (2009.01)

(52) U.S. Cl.
CPC .............. *H04W 80/02* (2013.01); *H04W 4/005* (2013.01); *H04W 4/14* (2013.01)
USPC ......................................................... 370/312

(58) Field of Classification Search
CPC ... H04W 80/04; H04W 80/045; H04W 80/08; H04W 80/02; H04W 4/005; H04W 4/14; H04L 29/06
USPC ......... 370/310, 312, 328, 338, 351, 389, 392, 370/395.1, 395.5, 395.54, 464, 465, 469, 370/474
See application file for complete search history.

(56) References Cited

U.S. PATENT DOCUMENTS

| | | | |
|---|---|---|---|
| 5,915,225 A * | 6/1999 | Mills .............................. | 455/558 |
| 2002/0083198 A1* | 6/2002 | Kim et al. ..................... | 709/245 |
| 2005/0175016 A1* | 8/2005 | Kim et al. ................ | 370/395.52 |
| 2005/0201412 A1* | 9/2005 | Janneteau et al. ............ | 370/464 |
| 2009/0073983 A1 | 3/2009 | Kim | |
| 2009/0112782 A1* | 4/2009 | Cross et al. ..................... | 706/45 |
| 2010/0227588 A1* | 9/2010 | Bradley ........................ | 455/411 |

FOREIGN PATENT DOCUMENTS

| | | |
|---|---|---|
| EP | 2 107 461 | 10/2009 |
| EP | 2 299 645 | 3/2011 |
| WO | 2004/054293 | 6/2004 |
| WO | 2008/112248 | 9/2008 |
| WO | 2009/127873 | 10/2009 |

OTHER PUBLICATIONS

Singh et al., "IP-Based Ubiquitous Healthcare System," International Conference on Control, Automation and Systems, pp. 131-136, (2008).
Finnish Search Report dated Apr. 18, 2011.

* cited by examiner

*Primary Examiner* — Obaidul Huq
(74) *Attorney, Agent, or Firm* — Barnes & Thornburg LLP

(57) ABSTRACT

A method and apparatus for providing IPv6 link-layer adaptation over a wireless channel are provided. The apparatus is configured to transmit and receive 6LoWPAN frames over a signaling channel of a wireless telecommunication system to provide IPv6 link-layer adaptation over the channel.

10 Claims, 7 Drawing Sheets

US 8,923,182 B2

METHOD AND APPARATUS FOR PROVIDING IPV6 LINK-LAYER ADAPTATION OVER A WIRELESS CHANNEL

FIELD

The invention relates to Internet Protocol version 6 communication over a wireless channel.

BACKGROUND

In modern communication and computer networks, data exchange between programs and computers is a vital element. Different programs, computers and processors exchange data without human intervention. This kind of communication is usually called machine-to-machine (M2M) communications. Different networks and protocols are used in different environments. On the Internet, the Transmission Control Protocol (TCP) and Internet Protocol (IP) are basic protocols used in communication. TCP takes care of assembling and disassembling the data to be transmitted in packets and reliability. IP handles framing and addressing so that packets are delivered to the correct destination. Above TCP/IP, different application protocols may be used such as client/server protocols, for example.

An example of a network technology where M2M communication is widely applied is a low-power wireless network, such as an IEEE 802.15.4 based embedded and sensor network. These networks are very energy efficient, and the chip technology is cheap. For this reason the technology is making its way to embedded devices very quickly for automation, measurement, tracking and control, for example. The use of these networks in buildings and other environments has increased in recent years.

Devices belonging to an embedded network may need to communicate with a server in the Internet, for example. For this reason, the devices are equipped with means for communicating over the Internet. Cellular systems, such the GSM (Global System for Communication) mobile phone system, are widely used for machine-to-machine communications for applications such as remote machine monitoring, automatic meter infrastructures and asset management. In M2M systems, the devices may include a cellular system modem for communicating with a backend M2M service of some kind. An example of a modem is a GPRS (General packet radio service) modem. Although some M2M applications may use SMS (Short Message Service) for communication, this is a very limited solution. The majority of applications needs IP connectivity, and thus uses IP (Internet Protocol) over GPRS. Respective connections are used in other types of cellular systems such as systems based on CDMA (Code division multiple access) or Third Generation (3G) systems such as UMTS (Universal Mobile Telecommunications System) or LTE (Long Term Evolution).

The present and still widely used Internet Protocol IPv4 has the drawback of having a limited address space as it uses 32 bits for addresses. Machine-to-machine applications often involve the monitoring of very large numbers of devices, which must be cheap and usually run off of battery power. In order to deal with the large number of nodes, IPv6 (Internet Protocol version 6) is clearly needed for its superior addressing scheme. In IPv6, 128 bits are used for addresses.

Today's solution for enabling GSM devices with IP using GPRS is causing major problems in the M2M industry and for telecom operators. GPRS is complex, reserves continuous resources from the GSM network, is too expensive, and requires too much power from M2M devices of low-power wireless networks. Although the IP data carried over GPRS could be somewhat compressed and made more efficient, this does not fix the majority of problems associated with GPRS.

BRIEF DESCRIPTION

According to an aspect of the present invention, there is provided an apparatus, comprising a processor; a memory including computer program code configured to, with the processor, cause the apparatus at least to perform: transmitting and receiving 6LoWPAN frames over a signaling channel of a wireless telecommunication system to provide IPv6 link-layer adaptation over the channel.

According to another aspect of the present invention, there is provided an apparatus, comprising a processor; a memory including computer program code configured to, with the processor, cause the apparatus at least to perform: transmit and receive 6LoWPAN frames; determine the address of the sender of a received 6LoWPAN frame; determine a category for a received 6LoWPAN frame on the basis of the sender address; and forward frames of different categories to different routers.

According to another aspect of the present invention, there is provided a subscriber identity module configured to be inserted into a mobile unit of cellular system and comprising: a processor; a memory including computer program code configured to, with the processor, cause the subscriber identity module at least to perform: control transmission and reception of 6LoWPAN frames over a signaling channel of a wireless telecommunication system to provide IPv6 link-layer adaptation over the channel.

According to another aspect of the present invention, there is provided a method, comprising transmitting and receiving 6LoWPAN frames over a signaling channel of a wireless telecommunication system to provide IPv6 link-layer adaptation over the channel.

LIST OF DRAWINGS

Embodiments of the present invention are described below, by way of example only, with reference to the accompanying drawings, in which FIG. 1 illustrates an example of a system to which embodiments of the invention may be applied;

DESCRIPTION OF EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

Figure 1:
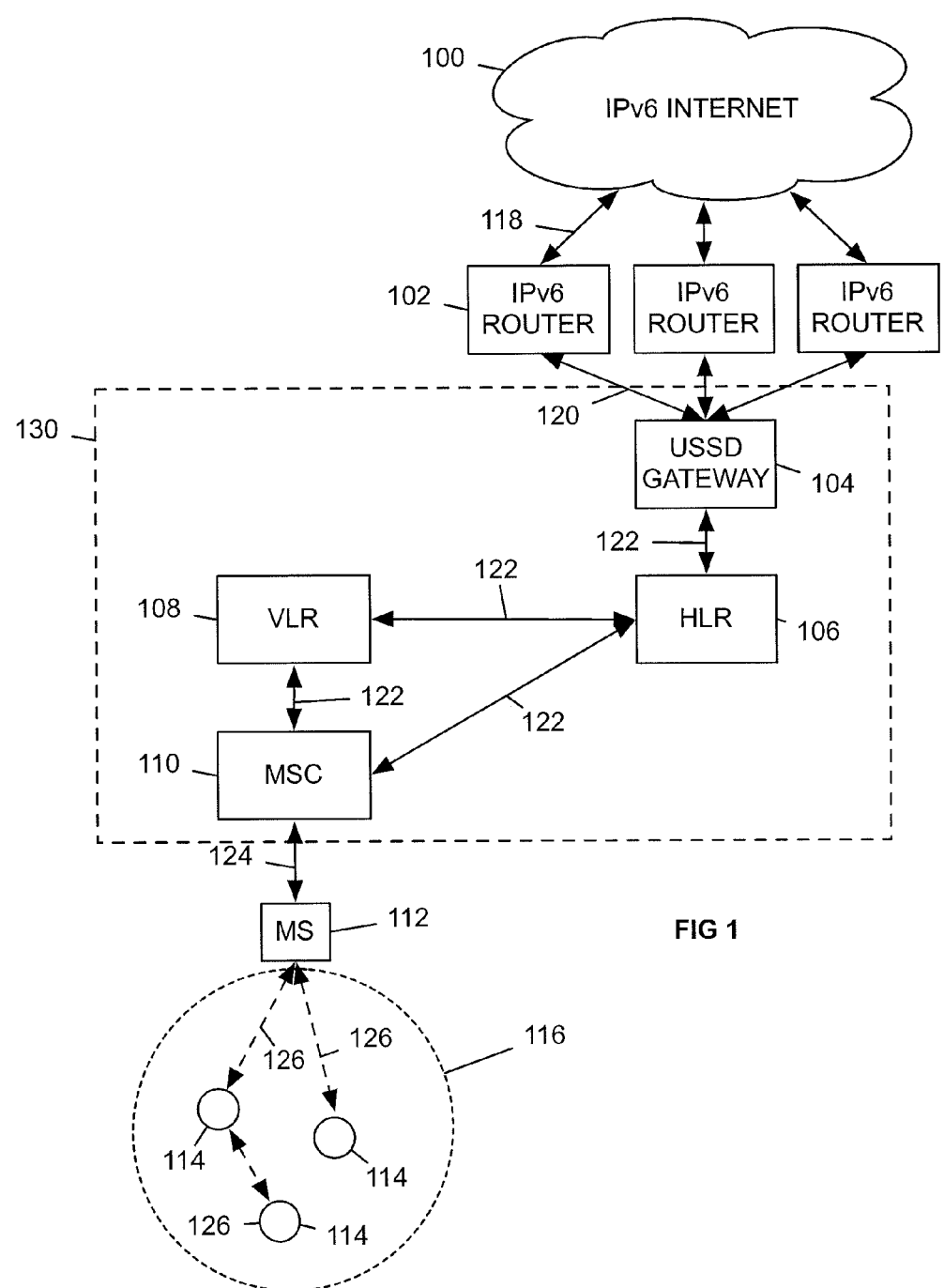

FIG. 1 illustrates an example of a network topology to which embodiments of the invention may be applied. The example network topology of FIG. 1 comprises a machine-to-machine communicating device 112. The device is configured to connect to the Internet 100 via a cellular network, in this example a GMS based network 130. The GSM based network may be a GSM network or an evaluation of the GSM network such as UMTS or LTE.

A GSM based network 130 comprises a mobile switching center MSC 10. The MSC is responsible for switching, paging, user equipment location registration, handover management, collection of subscriber billing information, frequency allocation management and many other services of a cellular network. A network may have one or more MSC depending on the size of the network.

The network 130 further comprises a home location register (HLR) 106 which contains a permanent subscriber register, i.e. the following information, for instance: an international mobile subscriber identity (IMSI), a mobile subscriber ISDN number (MSISDN), an authentication key, and when the radio system supports GPRS, a packet data protocol (PDP) address.

A visitor location register (VLR) 108 of the network 130 contains roaming information on user equipment in the area of the mobile services switching centre 110. The visitor location register 108 contains almost the same information as the home location register 106, but in the visitor location register 108, the information is kept only temporarily.

The network elements shown in FIG. 1 are functional entities whose physical implementation may vary. Usually, the mobile services switching centre 110 and the visitor location register 108 form one physical device, and the home location register 106 may form a second physical device. However, the physical realization of the elements is not relevant regarding the embodiments of the invention.

The elements of the network 130 are interconnected. In an embodiment, the connections are realized using GSM Mobile Application Part MAP 122 which works as a general bus between the network components.

The machine-to-machine communicating device 112 is connected 124 to the MSC 110 of the cellular network typically via a base station or an eNodeB (not shown in the figure). In an embodiment, there may be a base station controller (BSC) or a radio network controller (RNC) between a base station and the MSC. However, the connection between the device 112 and the networks is controlled by the MSC.

In an embodiment, the device 112 is a separate M2M device communicating with the Internet. In an embodiment, the device 112 may serve as a router for a sensor network 116 consisting of nodes 114 and links 126 between the nodes.

The sensor network 116 may be a low-power wireless network according to the standard IEEE 802.15.4 where IEEE stands for Institute of Electrical and Electronics Engineers. In an embodiment, the network is an IPv6 sensor network. This means that the radio interfaces 126 between the nodes 114 utilize IPv6. In an embodiment, the communication is realized according to Internet standard IETF RFC 4944 where IETF RFC stands for Internet Engineering Task Force Request for Comments. IETF RFC 4944 may be referred as 6LoWPAN (IPv6 over Low power Wireless Personal Area Networks).

In an embodiment, the radio interfaces 126 may be realized using IEEE 802.15.4 with ZigBee, Bluetooth or Bluetooth Ultra Low Power (ULP), Low Power Wireless Local Area Network, proprietary low-power radio, cellular radio system or any other system suitable for low power transmission. More than one radio interface may be used within a low-power wireless network and the interfaces may be incompatible with each other.

If the device 112 acts as a router for the low-power wireless network the device may utilize different radio interface when communicating with the wireless network and when communicating with the cellular network 130.

In an embodiment, the M2M communication 124 utilizing IPv6 between the device 112 and the Internet is realized using signaling channels of the cellular network the device is connected to.

In the example embodiment of FIG. 1, where the device 12 is connected to a GSM based network 130, the M2M communication 124 utilizing IPv6 is realized using Unstructured Supplementary Service Data (USSD). The IPv6 connection may be realized by transmitting and receiving Unstructured Service Supplementary Data service messages comprising IETF RFC 4944 frames. The IETF RFC 4944 or 6LoWPAN frames included in the USSD service messages carry the IPv6 protocol between the device 112 and the Internet. The proposed solution has many benefits over the prior art solution of realizing IP over GPRS. For example, the latency of the USSD service is much lower compared to GPRS or SMS setup times. In addition, 6LoWPAN over USSD is much simpler to implement than a full IP stack over GPRS. Furthermore, the power consumption is lower due to faster use of USSD and longer sleep times for devices. The cellular radio range of USSD is also better than that of GPRS.

In an embodiment, the device 112 transmitting IPv6 over USSD includes a small subset of the GSM standard for USSD signaling, a 6LoWPAN over USSD link layer adaptation and a 6LoWPAN protocol stack.

USSD is a service normally used for sending short text based messages which may be operator-defined. Typical uses for USSD messages relate to prepaid subscribers and call forwarding.

In GSM based systems, USSD utilizes GSM signaling channels for data transfer. If a mobile unit is idle mode, the SDCCH (stand-alone dedicated control channel) is used for data transfer. When a mobile unit having an active connection with the network (such as a call) FACCH (fast associated control channel) is used for data transfer.

The USSD service offers a half-duplex connection between a mobile unit and an application in the network. An USSD session can be initiated by either a mobile unit or a network application, and only one session can be open at a time. USSD is session-based, instant (no buffering) and reliable. USSD can also be routed back to the home network (HLR) of the mobile unit using the service. This allows for the same services to be provided even while the mobile units are roaming.

In the cellular network 130, backend USSD applications are handled by an entity called the USSD Gateway 104. The gateway may also be called a USSD Service Center. Normally, USSD applications are terminated at an entity connected directly to the USSD Gateway.

In an embodiment, the backend architecture is much more flexible compared to above. In the example of FIG. 1, one or more IPv6 Routers 102 act as USSD Applications for the 6LoWPAN over USSD service. The IPv6 routers are configured to route 118 the traffic to other IPv6 servers located anywhere in the Internet 100. Each IPv6 Router 102 is configured to communicate 120 with the USSD Gateway using a protocol supported by the USSD Gateway such as SMPP (Short Message Peer to Peer) or CIMD (Computer Interface to Message Distribution), for example.

Figure 2:
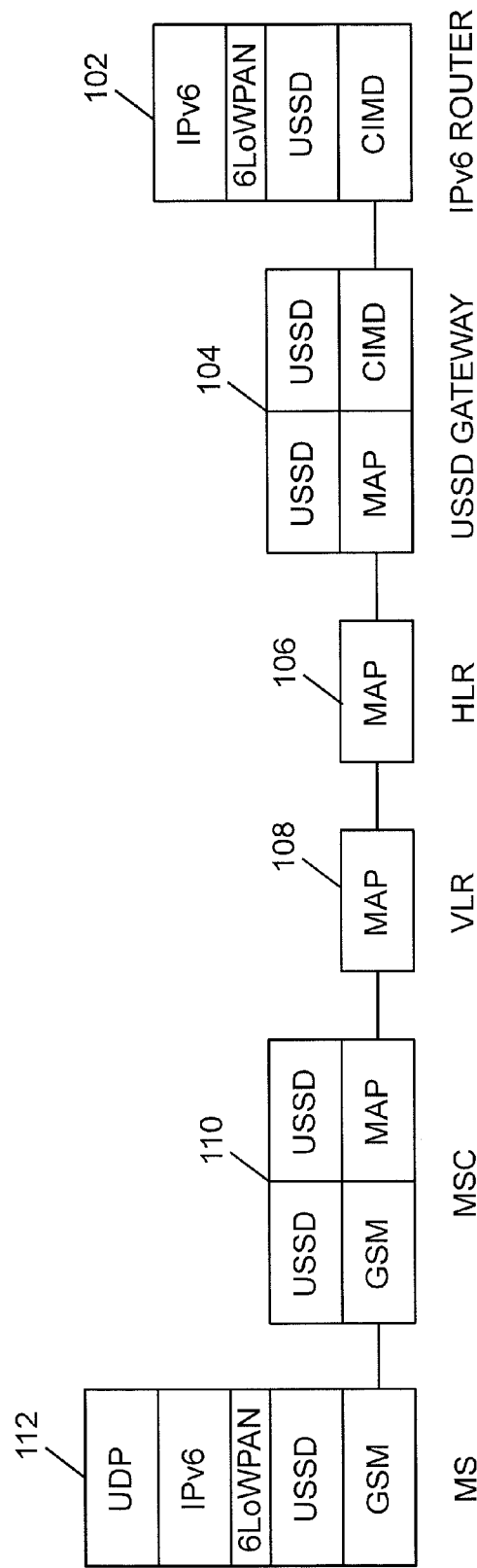
FIG. 2 illustrates an example of a protocol stack.
Figure 3:
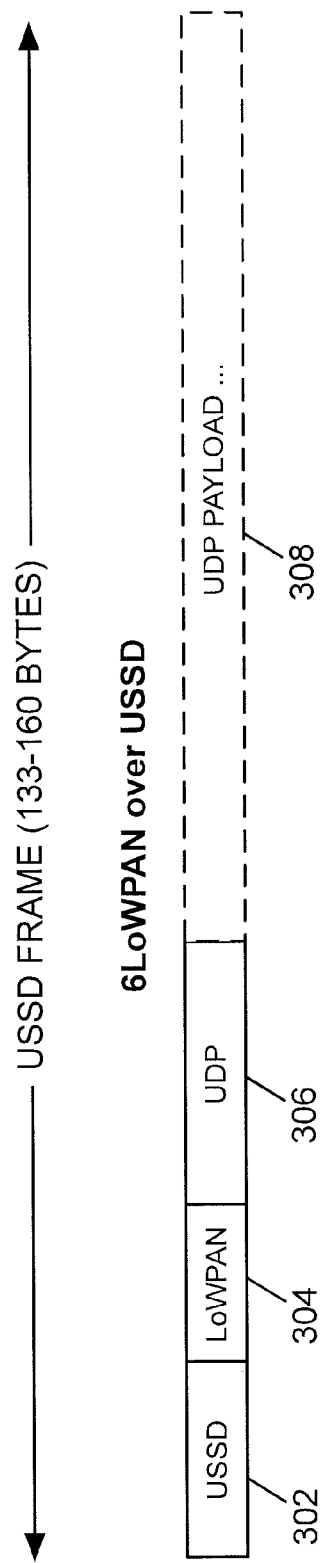
FIG. 3 illustrates USSD frame.

In the following, an embodiment is studied in connection with FIGS. 2 and 3. FIG. 2 illustrates an example of a protocol stack from the device 112 to the IPv6 Router 102. FIG. 3 illustrates how a 6LoWPAN frame may be carried in the payload (USSD String) of a USSD message.

The stack of device 112 comprises a GSM communication layer in full or as a subset supporting USSD. On top of the GSM layer is support for USSD, the 6LoWPAN adaptation layer, IPv6 and finally UDP (User Datagram Protocol) utilized in Internet communication. It should be noted that other transports such as TCP and any application protocol could be used as well.

The MSC 110, the VLR 108, the HLR 106 and the USSD Gateway 104 communicate using MAP. In the example of FIG. 2, the USSD Gateway 104 and the IPv6 Router 102 communicate using CIMD.

As stated above, USSD is a half-duplex signaling channel normally used for sending text messages from a mobile unit to an operator application or vice versa. A USSD session can be initiated by either the mobile unit or the network application, and only one session can be open at a time.

As FIG. 3 illustrates, a USSD frame may comprise a USSD header 302, 6LoWPAN header 304, a UDP header 306 and UDP payload (USSD string) 308. A USSD header consists of a Data Coding Scheme (DCS), possible Service Code (SC) for mobile-initiated USSD and possible Network Equipment Indicator (NEI) for network-initiated USSD. The USSD payload (USSD String) is normally used for carrying 7-bit ASCII text. The size of a USSD String may vary from 133 to 160 octets depending on the message.

In an embodiment, 6LoWPAN is used to carry IPv6 natively over USSD. The LoWPAN adaptation layer is placed directly in the USSD String. In GSM based networks, the USSD String is sent using a Data Coding Scheme (DCS) with 8-bit coding (bit3=0, bit2=1). Thus the default DCS setting for both mobile and network-initiated USSD is 11110101=0xF5. Some GSM networks or GSM modems however only allow a DCS code of 0xF0 (default 7-bit coding). In such cases, Base64 encoding may be used to carry binary data in the USSD String.

When a mobile unit initiates USSD, it must indicate a USSD service class in the initial request in the form "*SC*ATTRIBUTE#" where SC is an integer identifying the USSD application to route the message to and ATTRIBUTE# is an optional value to pass to the USSD application at which the message is directed. In an embodiment of the invention, a given SC value is used to identify the 6LoWPAN over USSD service. The ATTRIBUTE value is not used. Advantageously, the given SC value is from the HLR SC space of the mobile unit. In an embodiment, the 6LoWPAN over USSD backend is hosted at the home network of the MS. In GSM terminology, the home network is denoted as HPLMN (Home Public Land Mobile Network). A non-limiting example of a given SC value is *123#.

Returning to FIG. 3, the USSD header 302 carries any needed USSD information such as the DCS and SC. This header has variable length thus the size of the payload varies depending on the message type. The USSD header is immediately followed by a 6LoWPAN header 304. The first byte of the header indicates the type of LoWPAN frame. In an embodiment, the first byte may indicate two types: Empty and More-Data. These types will be explained below. The LoWPAN header compresses IPv6, and in FIG. 3 the entire IPv6 header is compressed away. If there would be IPv6 fields, they would immediately follow the LoWPAN header 304. Next follows the UDP header 306 follows, and finally the payload (USSD String) 308. It should be noted that UDP is used here only as an example. Other protocols may be used as well.

When the device 112 acts as a 6LoWPAN over USSD host, the addressing for the host is achieved using IPv6 auto-configuration which builds the 128-bit IPv6 address from the 64-bit prefix advertised (usually less than 64-bits plus padding) by the IPv6 router 102 and the interface identifier of the host device 112. In an embodiment, the interface identifier of the host device 112 is formed from the 15-digit MSISDN of the GSM SIM card of the host device 112. This is achieved by encoding the 15 MSISDN digits as 4-bit packed unsigned integers (4×15=60 bits) plus 4-bits of 0 padding to make 64 bits. Before auto-configuration, the host device 112 may optionally send a Router Solicitation (RS) message to the IPv6 Router, resulting in a Router Advertisement (RA) back containing the 64-bit prefix. This step is however unnecessary for hosts and may be skipped if they don't need to know their own IPv6 address as 6LoWPAN compression elides the prefix information in the packets in any case.

Let us study an example of forming an address (MSISDN→64-bit IID):

The MSIDSN is of the form: 000358501234567
MSIDSN in Decimal notation: 0-0-0-3-5-8-5-0-1-2-3-4-5-6-7
MSIDSN in Binary notation: 0000-0000-0000-0011-0101-1000-0101-0000-0001-0010-0011-0100-0101-0110-0111
plus 4-bit padding 0000

Each decimal digit converted to 4-bit binary value, concatenated with 4-bit 0 padding into a 64-bit binary value.

When the device 112 acts as a 6LoWPAN over USSD router handling an IPv6 network behind it, the addressing is achieved in a similar way as that for a host. The device 112 acting as a router first autoconfigures its own GSM interface using RS/RA (Router Solicitation/Router Advertisement) and then builds its address from the MSISDN. In addition, The device 112 acting as a router must acquire its own 64-bit prefix(es) to advertise on its local interfaces. This is achieved by using e.g. DHCPv6 (Dynamic Host Configuration Protocol for IPv6) to request one or more prefixes from the IPv6 Router 102. The device 112 acting as a router then uses these assigned prefixes with its own local interfaces and performs normal IPv6 routing between networks. In this configuration, the router can not compress the address field prefix of IPv6 forwarded packets, but can normally compress its own outgoing packets.

As USSD allows only one session for an MS at a time, and the session is half-duplex, there is a need for controlling the flow control to enable the transmission of IPv6 packets in both directions. In an embodiment, the flow control is realized without any additional overhead. As a solution, the concepts of a More-Data indicator and timeouts are introduced. The More-Data indicator tells the corresponding end-point that the sender has messages in transmission queue, i.e. more packets are waiting to be sent and that the end-point should send a return message immediately (with an empty payload if there is no data waiting on that side). This allows multiple IPv6 packets to be sent quickly in series. The More-Data indication is achieved using a DCS code 0x05 instead of the default 0xF5. In some GSM networks, DCS codes may be limited. For that reason, in another embodiment of the invention, More-Data indication is realized using a different 6LoWPAN header dispatch value (first byte in the header 304 of FIG. 3) from the default. If an empty packet must be returned due to the More-Data indication, this is done by placing a single byte 0x0 in the frame which corresponds to a special code in 6LoWPAN and is ignored (USSD does not allow totally empty messages).

For efficient flow control, a timeout is defined. The timeout defines the time to wait before sending an empty frame if the More-Data indicator is not sent or to wait before terminating a session if no new data has been sent for that time. In an embodiment, the realization of this USSD link layer adaptation may require some error codes, which are encoded as special 6LoWPAN dispatch values. Other IPv6 errors are sent normally as standard ICMPv6 error messages.

USSD traffic can be initiated either by a mobile unit or by the network. For the purpose of the embodiments of the invention, both mobile initiated and network initiated traffic are treated equally although there may be small implementation differences.

Figure 4:
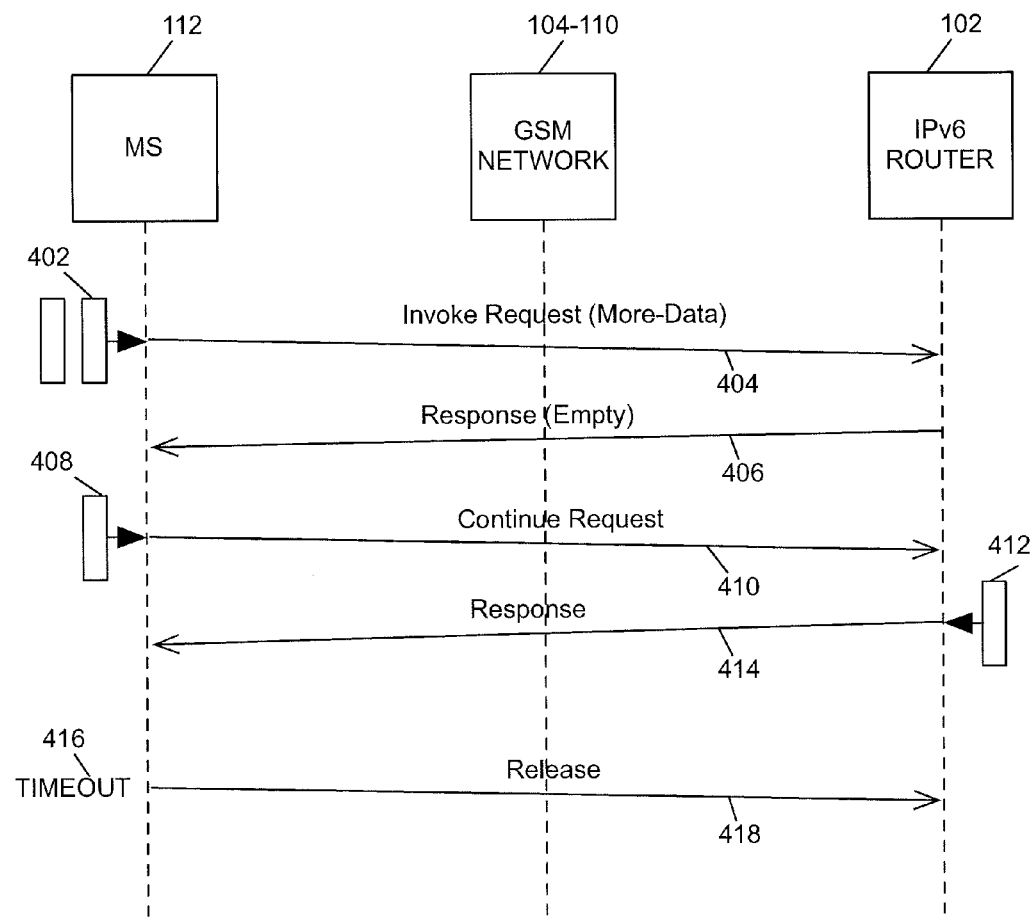
FIG. 4 illustrates an example of the flow of USSD messages used to carry 6LoWPAN frames.

FIG. 4 shows the flow of USSD messages used to carry 6LoWPAN frames in the mobile initiated case. The network-initiated case is similar but in the other direction. A USSD session is initiated by the mobile unit 112 when it sends the first Invoke Request message 404 using given SC code. The message is handled by the GSM network elements 104 to 110 and delivered to the IPv6 Router 102. In this example, the mobile unit 112 has two IPv6 messages waiting in its queue 402, thus it sets the More-Data flag in message 404 when sending the first message. The IPv6 Router 102 detects the More-Data indicator and immediately responds with an Empty message 406 to give control back to the mobile unit 112.

The mobile unit 112 proceeds to immediately send a second IPv6 message 408 in a Continue Request message 410 without the More-Data flag. The IPv6 Router 102 then waits up to TIMEOUT for an IPv6 message to send back to the mobile unit. In the example, an IPv6 message arrives 412 during the TIMEOUT and is sent back in a Response message 414. Finally, the mobile unit 112 waits for up to TIMEOUT 416 seconds before sending a Release indicator 418 to the network.

Figure 5:
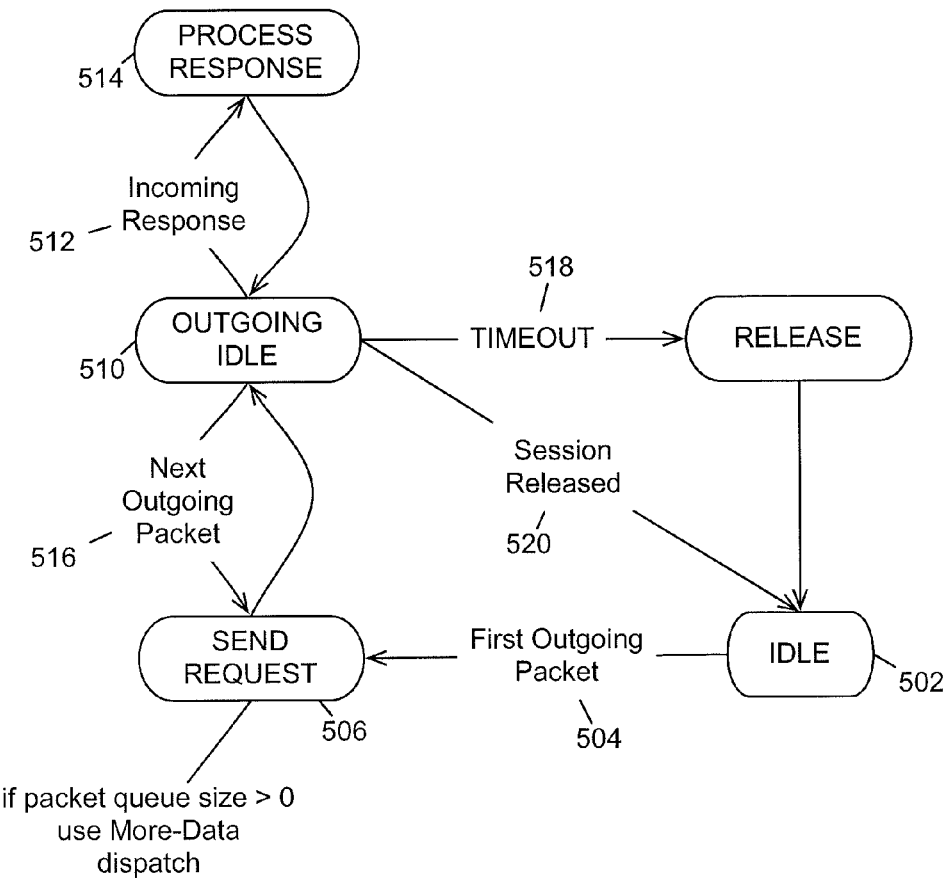
FIG. 5 illustrates an example of a state machine of a mobile unit.

In an embodiment, flow control is achieved for 6LoWPAN over USSD by keeping a simple state machine at both the USSD end points for each active session. FIG. 5 shows the state machine of the mobile unit 112 used to handle mobile-initiated USSD sessions. The state machine of an IPv6 Router is similar.

The mobile unit 112 starts in an IDLE state 502. When the mobile unit 112 has an IPv6 packet to send 504 it enters the SEND REQUEST 506 state, where it sets the More-Data flag if it has more IPv6 packets waiting in its queue 508.

The mobile unit 112 then enters the OUTGOING IDLE state 510 while waiting for a Response or TIMEOUT. On receiving an incoming response (512) the mobile unit 112 moves to the PROCESS RESPONSE state 514 where it sends the incoming message (if valid) to the IPv6 stack. Next, the mobile unit 112 returns to the OUTGOING IDLE state. From there the mobile unit 112 may send another outgoing IPv6 packet 516, the TIMEOUT may occur from no activity 518 or the session may be released by the network 520.

In an embodiment, fragmentation is needed as the minimum transmission unit that IPv6 requires is 1280 bytes and USSD has only a maximum of 160 byte payloads. This is achieved using the 6LoWPAN fragmentation header, which splits the larger IPv6 packet into fragments and reassembles them on the other side of the USSD link.

It can be assumed, that the number of M2M devices will increase in the future. The predicted huge number of M2M devices will generate large amounts of traffic. Normally a single USSD application would need to deal with all the USSD traffic for its Service Code and thus become a possible bottleneck. In an embodiment of the invention, segmentation of the traffic may be performed and better performance obtained through routing. This is achieved using MSISDN filtering at the USSD Gateway 104 to segment the MSISDN number space into blocks, each one assigned to a different IPv6 Router 102. For example, the MSISDN number spaces of different operators may be divided into different blocks. Thus, the USSD Gateway or other network element receiving a USSD frame determines the MSISDN of the sender and on the basis of the MSIDSN categorizes the frame into a given category. The frame may be sent to a router serving the category. The USSD Gateway may be configured to perform the segmentation automatically for mobile-initiated USSD traffic.

In an embodiment, IPv6 routers may be connected directly to the USSD Gateway for each MSISDN block. The 6LoWPAN over USSD state machine may implemented in the IPv6 Router, although this may also be realized in the USSD Gateway. When outgoing 6LoWPAN frames reach the IPv6 router, they are expanded. The IPv6 source address has the prefix of that IPv6 router. Thus responses to that message are automatically routed back through the same IPv6 router.

Figure 6:
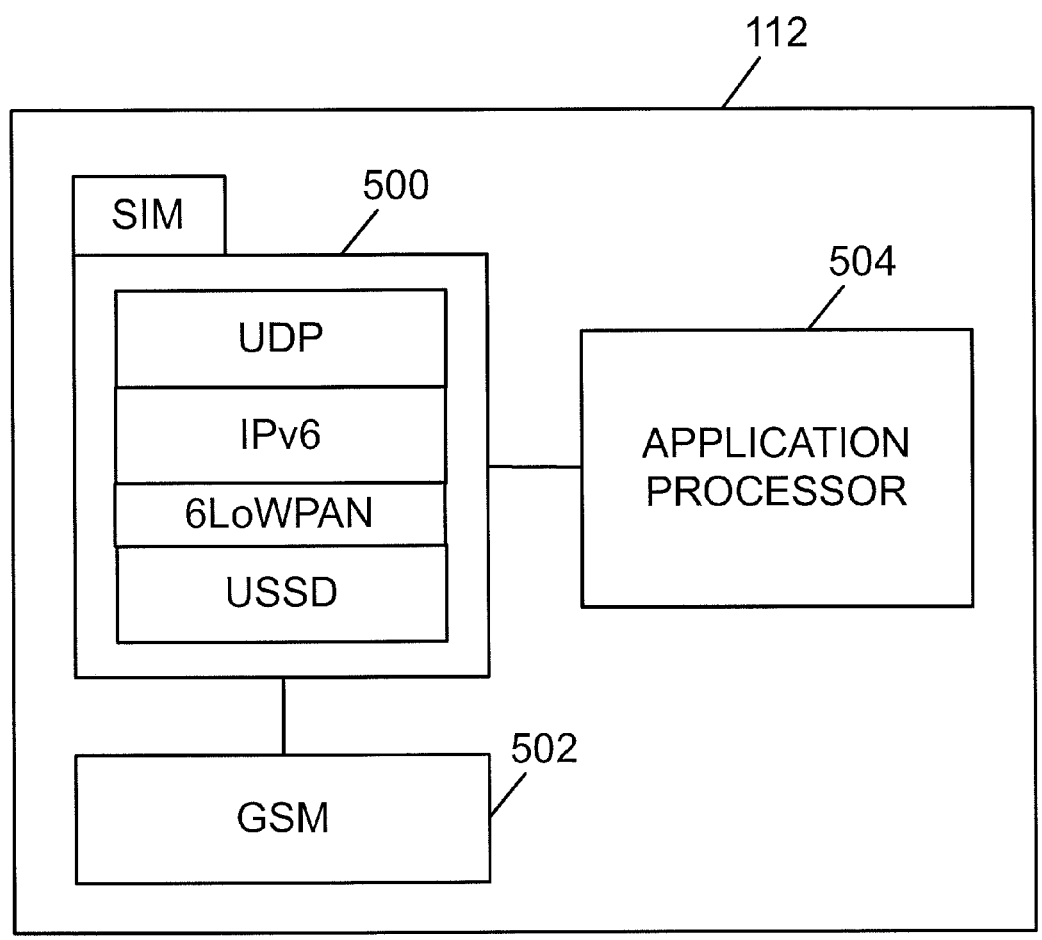

FIG. 6 illustrates an example of an apparatus. The apparatus 112 comprises a communication interface 502 such as a GSM transceiver. The apparatus further comprises an application processor configured to execute software applications. In an embodiment, the apparatus comprises a smart card such as a subscriber identity module (SIM) 500. In GSM based systems, a SIM or a respective smart card is a removable card which provides subscriber identity. SIM and other respective smart cards comprise a processor and memory, which may be both read-only and read-and-write memory. In an embodiment, the 6LoWPAN over USSD stack functionality described above is included in the SIM 500.

The 6LoWPAN stack on the SIM card uses the GSM transceiver 502 through its normal interface. Access to the stack is provided via Socket application programming interface (API) like calls from an Application Processor 504 either multiplexed on the normal SIM card interface, or using one of the free pins of the SIM card such as a universal asynchronous receiver/transmitter (UART) or Inter-Integrated Circuit ($I^2C$). This embodiment is a total breakthrough in M2M as it allows extremely simple and cheap M2M modems, and including the 6LoWPAN over USSD functionality in the SIM card allows easy inclusion of the technique to existing GSM modems by just changing the SIM card.

Figure 7:
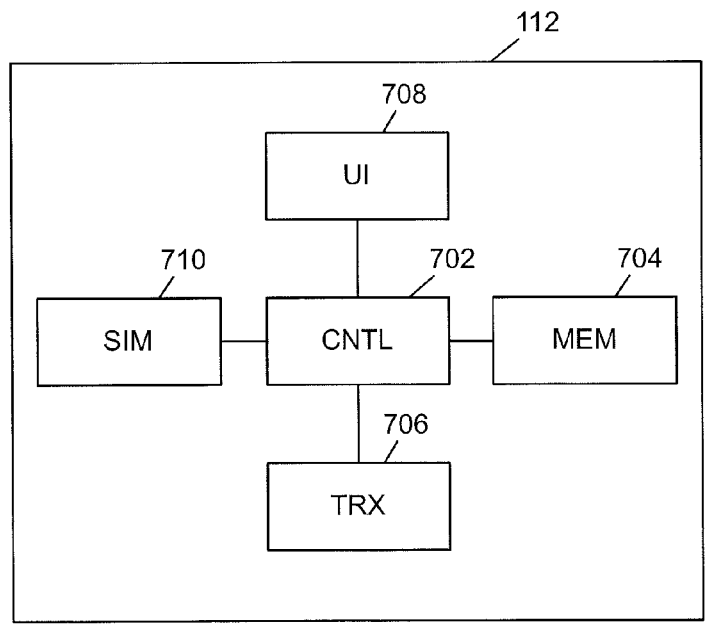
FIGS. 6, 7, 8A and 8B illustrate examples of apparatuses.

FIG. 7 illustrates another example of an apparatus. The apparatus 112 comprises a processor 702, a memory 704, a communication interface 706 such as a GSM transceiver, a SIM reader 710 where a SIM may be inserted, and optionally user interface 708. The user interface may comprise speaker, display, keyboard and a microphone. In case of a M2M device, the apparatus does not necessarily need user interface at all. The apparatus may comprise other components such as sensors and other interfaces. In this embodiment, the 6LoWPAN over USSD stack described above is implemented in the processor 702 and the memory 704.

The apparatus 112 refers to a portable computing device. Such computing devices include wireless mobile communication devices operating with or without a subscriber identification module (SIM), including, but not limited to, the following types of devices: mobile phone, smartphone, personal digital assistant (PDA), handset. A wireless connection may be implemented with a wireless transceiver operating according to the GSM (Global System for Mobile Communications), WCDMA (Wideband Code Division Multiple Access), WLAN (Wireless Local Area Network) or Bluetooth® standard, or any other suitable standard/non-standard wireless communication means.

Figure 8A:
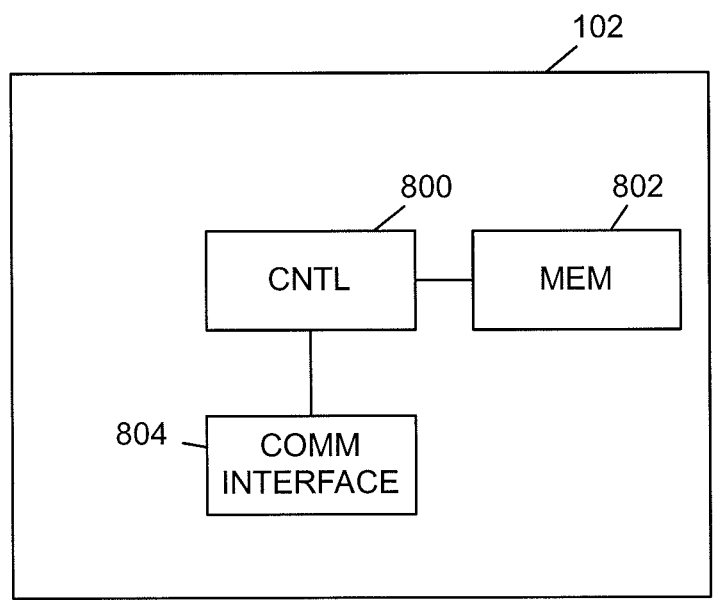

FIG. 8A illustrates another example of an apparatus. In this example the apparatus may be an IPv6 Router. The apparatus 102 comprises a processor 800, a memory 802 and a communication interface 804. The communication interface 804 may provide the apparatus with a connection to a USSD Gateway 104, HLR 106 and MSC 110 of a cellular system, and enable the apparatus under the control of the processor to transmit and receive 6LoWPAN frames over a signaling channel of a wireless telecommunication system to provide IPv6 link-layer adaptation over the channel. In a GSM based system, the apparatus is configured to transmit and receive Unstructured Service Supplementary Data (USSD) service messages comprising 6LoWPAN frames.

Figure 8B:
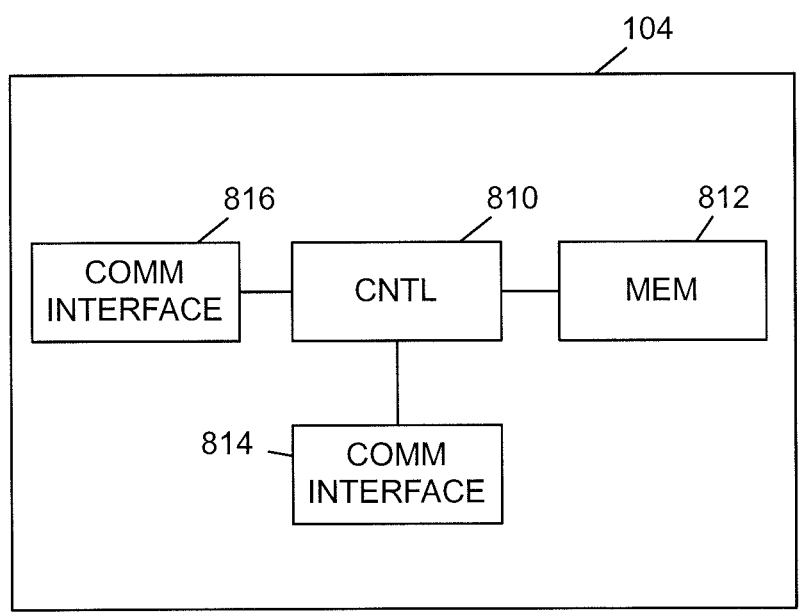

FIG. 8B illustrates another example of an apparatus. In this example the apparatus may be a USSD Router. The apparatus 120 comprises a processor 810, a memory 812, a first communication interface 814 and a second communication interface 816. The first communication interface 814 may provide the apparatus with a connection to a HLR 106 and MSC 110 of a cellular system using GSM MAP, for example. The second communication interface 816 may provide the apparatus with a connection to one or more IPv6 Routers 102 using appropriate protocol such as SMPP (Short Message Peer to Peer) or CIMD (Computer Interface to Message Distribution), for example. In practice, the first and the second interface may be integrated into a single unit.

The apparatus of FIG. 8B may be configured to receive a 6LoWPAN frame from another network element such as a HLR 106. The apparatus may be configured to determine the sender of the frame and determine a category for received 6LoWPAN frame on the basis of the sender address. The apparatus may be further configured to forward frames of different categories to different routers.

The apparatuses of FIGS. 6, 7, 8A and 8B may be implemented as an electronic digital computer, which may comprise a working memory (RAM), a central processing unit (CPU), and a system clock. The CPU may comprise a set of registers, an arithmetic logic unit, and a control unit. The control unit is controlled by a sequence of program instructions transferred to the CPU from the RAM. The control unit may contain a number of microinstructions for basic operations. The implementation of microinstructions may vary, depending on the CPU design. The program instructions may be coded by a programming language, which may be a high-level programming language, such as C, Java, etc., or a low-level programming language, such as a machine language, or an assembler. The electronic digital computer may also have an operating system, which may provide system services to a computer program written with the program instructions.

An embodiment provides a computer program embodied on a distribution medium, comprising program instructions which, when loaded into an apparatus, provide the apparatus with the 6LoWPAN over USSD stack described above.

The computer program may be in source code form, object code form, or in some intermediate form, and it may be stored in some sort of carrier, which may be any entity or device capable of carrying the program. Such carriers include a record medium, computer memory, read-only memory, and software distribution package, for example. Depending on the processing power needed, the computer program may be executed in a single electronic digital computer or it may be distributed amongst a number of computers.

It will be obvious to a person skilled in the art that, as technology advances, the inventive concept can be implemented in various ways. The invention and its embodiments are not limited to the examples described above but may vary within the scope of the claims.

The invention claimed is:

1. An apparatus, comprising:
a processor; and
a memory including computer program code configured to, with the processor, cause the apparatus to transmit and receive Unstructured Service Supplementary Data (USSD) service messages comprising 6LoWPAN frames over a signaling channel of a wireless telecommunication system to provide IPv6 link-layer adaptation over the channel,
the apparatus being configured to transmit and receive USSD frames comprising a USSD header, 6LoWPAN header, a User Datagram Protocol (UDP) header and a UDP payload, wherein the frame comprises an indicator regarding whether the sender of the frame has messages in its transmission queue, and
the apparatus being configured to transmit and receive USSD frames where the 6LoWPAN header comprises the indicator.

2. The apparatus of claim 1, further configured to transmit and receive USSD frames comprising a specific Data Coding Scheme code as the indicator.

3. The apparatus of claim 1, further configured to send a reply to a received message without delays if the received message indicates that the sender has messages in transmission queue.

4. The apparatus of claim 1, further configured to:
store a Mobile Subscriber Integrated Services Digital Network Number (MSISDN) comprising 15 digits; and
generate an interface identifier for the IPv6 address of the apparatus by encoding the 15 digits of the MSISDN as 4-bit packed unsigned integers and adding 4-bits of 0 padding.

5. A method comprising transmitting and receiving 6LoWPAN frames over a signaling channel of a wireless telecommunication system to provide IPv6 link-layer adaptation over the channel, the method comprising:
transmitting and receiving USSD frames comprising a USSD header, 6LoWPAN header, a User Datagram Protocol (UDP) header and a UDP payload, wherein the frame comprises an indicator regarding whether the sender of the frame has messages in its transmission queue; and
transmitting and receiving USSD frames where the 6LoWPAN header comprises the indicator.

6. The method of claim 5, further comprising transmitting and receiving USSD frames comprising a specific Data Coding Scheme code as the indicator.

7. The method of claim 5, further comprising sending a reply to a received message without delays if the message indicates that the sender has messages in transmission queue.

8. The method of claim 5, further comprising:
storing a Mobile Subscriber Integrated Services Digital Network Number (MSISDN) comprising 15 digits; and
generating an interface identifier for the IPv6 address of the apparatus by encoding the 15 digits of the MSISDN as 4-bit packed unsigned integers and adding 4-bits of 0 padding.

9. The method of claim 5, further comprising determining a category for received 6LoWPAN frames on the basis of the sender address.

10. The method of claim 5, further comprising forwarding frames of different categories to different routers.

* * * * *